Patented Nov. 25, 1952

2,619,511

UNITED STATES PATENT OFFICE 2,619,511

PRODUCTION OF UNSATURATED HYDROCARBONS

Richard Conrad, Heidelberg, Germany

No Drawing. Application May 10, 1950, Serial No. 161,250. In Germany June 2, 1949

6 Claims. (Cl. 260—681)

The present invention relates to an improved process for the production of unsaturated hydrocarbons.

I have found that unsaturated hydrocarbons of higher molecular weight than the initial materials are obtained by leading olefines or alcohols together with aliphatic ethers at elevated temperatures over catalysts promoting the splitting off of water.

As unsaturated hydrocarbons there are preferably employed gaseous olefines, such as ethylene, propylene or butylene, or alcohols having the same number of carbon atoms from which the said olefines are formed during the process. Higher unsaturated hydrocarbons or the corresponding alcohols may also serve as initial materials. The olefines are reacted with the ethers singly or in admixture with each other and if desired together with saturated hydrocarbons. Mixtures of olefines and paraffin hydrocarbons such as are formed by the catalytic dehydrogenation of gaseous hydrocarbons, or the gaseous products rich in olefines obtained by the reaction of carbon monoxide with hydrogen are especially suitable.

As ethers there may be mentioned in particular dimethyl ether, as well as other aliphatic ethers, as for example diethyl ether, methyl ethyl ether, diisopropyl ether and methyl vinyl ether.

As catalysts promoting the splitting off of water there may be employed in particular difficultly-reducible metal oxides, as for example the oxides of aluminum, magnesium, chromium, thorium, tungsten or titanium. Phosphates, silicates, kaolin, graphite or infusorial earths may also serve as catalysts.

Depending on the catalysts used, the reaction is carried out at temperatures between 200° and 500° C. and at atmospheric or increased pressure.

The reaction products consist of unsaturated hydrocarbons with straight or branched carbon chains with one or more double linkages. Thus, for example, from propylene and methyl ether there is obtained a mixture of butylene, pentene, hexene, heptylene, octene and higher olefines as well as the corresponding iso-compounds. The content of diolefines in the products varies between 3 and 70 per cent according to the temperature employed. If the olefines are allowed to act in excess on the ethers, only a few methyl groups become added on and there are obtained, for example from propylene, mainly butylenes and amylenes. On the other hand, if the ethers are use in excess, the yield of high-boiling liquid and solid products is increased.

The following example will further illustrate the invention but the invention is not limited to this example.

Example

In an electrically heated quartz reaction tube 19 liters of dimethyl ether and 132 liters of normal butylene are led per hour over 200 cubic centimeters of active alumina at from 350° to 360° C. By cooling the reaction gas with solid carbon dioxide, a condensate is obtained which is freed from unchanged butylene and methyl ether by distillation. In 70 hours there are obtained 1700 grams of liquid products of the following composition:

Pentenes 25 per cent with 16 per cent of diolefines
Hexenes 12.7 per cent with 16 per cent of diolefines
Heptenes 8.0 per cent with 37 per cent of diolefines
Octenes 8.3 per cent with 71 per cent of diolefines
Higher hydrocarbons 44 per cent with iodine numbers between 215 and 367
Solid products 2 per cent 6.4 per cent of the reacted methyl ether is decomposed into carbon monoxide and methane.

What I claim is:

1. A process for the production of higher molecular weight unsaturated hydrocarbons which consists in causing an olefine, to react with an aliphatic ether at between 200° and 500° C. in the presence of catalysts promoting the splitting off of water.

2. The process as claimed in claim 1 wherein an olefinic hydrocarbon containing between 2 and 4 carbon atoms is used as the olefine.

3. A process for the production of higher molecular weight unsaturated hydrocarbons which consists in causing an olefinic hydrocarbon containing between 2 and 4 carbon atoms to react with a low molecular weight aliphatic ether at between 200 and 500° C. in the presence of a difficultly reducible metal oxide.

4. A process for the production of higher molecular weight unsaturated hydrocarbons which consists in causing an olefinic hydrocarbon containing between 2 and 4 carbon atoms to react with dimethyl ether at between 200 and 500° C. in the presence of a difficultly reducible metal oxide.

5. A process for the production of higher molecular weight unsaturated hydrocarbons which consists in causing an olefinic hydrocarbon containing between 2 and 4 carbon atoms to react with dimethyl ether at between 200 and 500° C. in the presence of alumina.

6. A process for the production of higher molecular weight unsaturated hydrocarbons which consists in causing normal butylene to react with dimethyl ether at between 200 and 500° C. in the presence of alumina.

RICHARD CONRAD.

REFERENCES CITED

The following references are of record in the file of this patent:

UNITED STATES PATENTS

| Number | Name | Date |
| --- | --- | --- |
| 2,346,452 | Pevere et al. | Apr. 11, 1944 |
| 2,402,137 | Hanford et al. | June 18, 1946 |
| 2,457,229 | Hanford et al. | Dec. 28, 1948 |
| 2,492,984 | Grosse et al. | Jan. 3, 1950 |